UNITED STATES PATENT OFFICE.

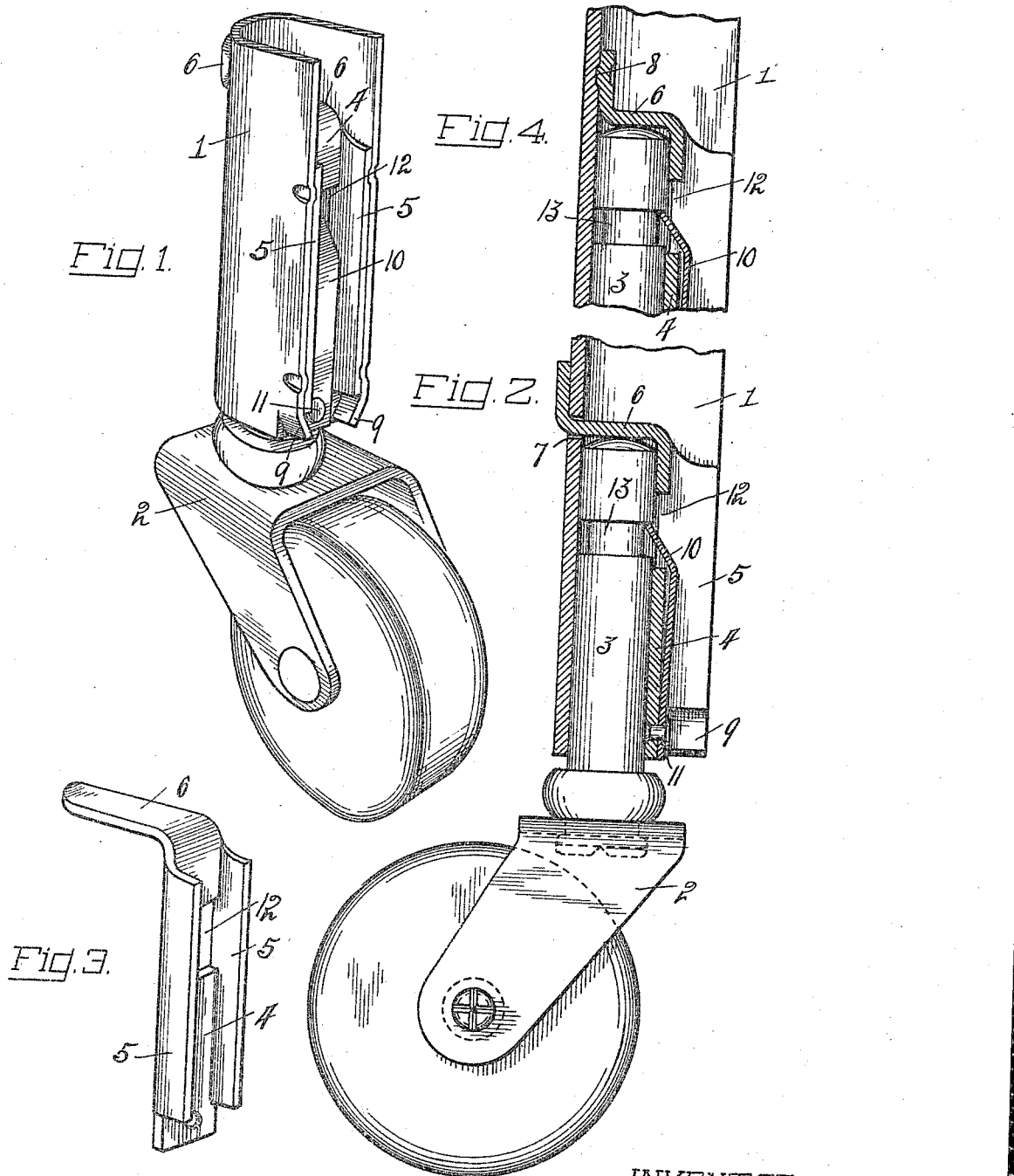

CLEMENT R. UHL, OF TOLEDO, OHIO.

CASTER-HOLDING MEANS FOR FURNITURE-LEGS.

1,229,547.     Specification of Letters Patent.     Patented June 12, 1917.

Application filed November 3, 1916. Serial No. 129,294.

*To all whom it may concern:*

Be it known that I, CLEMENT R. UHL, a citizen of the United States, and a resident of Toledo, in the county of Lucas and State of Ohio, have invented a certain new and useful Caster-Holding Means for Furniture-Legs; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates particularly to caster holding means for furniture legs, and has for its object the provision of improved means of this class which is simple, strong and durable in its construction, and particularly adapted for use in connection with metal legs of the channel bar type.

The invention is fully described in the following specification, and while, in its broader aspect, it is capable of embodiment in numerous forms, a preferred embodiment thereof is illustrated in the accompanying drawings, in which—

Figure 1 is a perspective view of the lower end portion of a leg provided with my invention, with a caster held in position therein. Fig. 2 is a central longitudinal section thereof with the caster in full. Fig. 3 is a perspective view of the caster stem holding plate separate from the leg, and Fig. 4 is a sectional detail with the manner of securing the caster stem holding plate to the leg slightly modified.

Referring to the drawings, 1 designates a furniture leg, which is U-shaped in cross-section, and 2 a caster wheel fork having the stem 3 projecting upward therefrom and of suitable size to fit in the base portion of the leg channel lengthwise thereof, as shown.

A plate 4 is mounted in the leg channel at the outer side of the caster stem 3 and coöperates with the base portion of the leg channel to form a stem receiving socket. The plate 4 is set into the leg channel and has an integral upwardly projecting flange 5 at each side edge in contact with the respective leg side, and rigidly fixed thereto in a strong and durable manner, as, for instance, by electric spot welding. The upper end of the stem receiving socket is closed by a tongue 6 for receiving the upper end thrust of the caster stem. The tongue 6 projects inward from the upper end of the plate 4 transversely of the leg channel and through a registering opening 7 in the channel base or crown portion, with its outer end bent lengthwise of the leg flat against the outer side of its crown portion. The bending of the tongue end may be performed before or after the assembling of the leg and plate as desired. In Fig. 4 the angled end of the tongue 6 is shown as being disposed within the leg channel and electrically welded to the inner side of the leg crown, as at 8, instead of being hooked through the opening 7.

In order to further insure the lower end of the plate 4 from outward movement relative to the leg channel, the side flanges 5 terminate at their lower ends short of the lower end of the leg, and tongues 9 are struck inward from the side walls of the leg at the lower end thereof in engagement with the outer side of the plate 4 below the lower ends of the respective flanges 5, as shown.

The caster stem 3 is rotatably retained within the receiving socket provided therefor by a spring finger 10 which is fixed at its lower end to the lower end portion of the plate 4 at the outer side thereof, as by a rivet 11, and has its upper free end angled inward through an opening 12 in the plate 4 and into an annular recess 13 in the stem 3 in position to engage the upper wall of said recess and prevent a withdrawal of the stem from the socket. The spring finger 10 may be sprung outward to release the stem, as is apparent.

I wish it understood that my invention is not limited to any specific construction, arrangement or form of the parts, as it is capable of numerous modifications without departing from the spirit of the claims.

Having thus described my invention, what I claim as new, and desire to secure by Letters Patent, is—

1. A leg having its lower end channel-form in cross-section, a member fixed in said leg and coöperating therewith to form a caster stem receiving socket, and spring means carried by said member and projected therefrom into the caster receiving socket to serve as a caster stem retaining means.

2. A leg having its lower end channel-form in cross-section, a plate set into the channel of the leg to coöperate therewith to form a caster stem receiving socket, said plate having side flanges extending outward therefrom in contact with the side walls of the leg channel and fixedly secured thereto, and a tongue projecting from the inner end of said plate across the upper end of said socket.

3. A leg having its lower end channel-form in cross-section, a plate fixed in the leg channel to coöperate therewith to form a caster stem receiving socket, and tongues transversely projecting from the side walls of the leg channel and engaging said plate to assist in holding it in position within the leg channel.

4. A leg having its lower end channel-form in cross-section, a plate set into said leg to coöperate therewith to form a caster stem receiving socket, said plate having side flanges projecting outward therefrom and fixed to respective side walls of the leg channel and having a tongue projecting transversely from its upper end across the socket through the crown portion of the leg and angled without said crown portion to engage the outer side thereof.

5. A leg having its lower end U-shaped in cross-section, a plate set into said leg to coöperate therewith to form a caster stem receiving socket, said plate having side flanges projecting outward therefrom and fixed to respective side walls of the leg channel, and having a tongue projecting transversely from its upper end across the socket and fixed to the crown portion of the leg channel, and tongues projecting inward from the leg side walls at the lower ends thereof and engaging the upper side of said plate.

6. A leg having its lower end U-shaped in cross-section, a plate set into said leg to coöperate therewith to form a caster stem receiving socket, said plate having side flanges projecting outward therefrom and fixed to respective side walls of the leg channel, and having a tongue projecting transversely from its upper end across the socket and fixed to the crown portion of the leg channel, said plate having an opening therein and a spring finger fixed to the upper side of said plate and having its free end projected through said opening into the socket in caster stem engaging position.

In testimony whereof, I have hereunto signed my name to this specification.

CLEMENT R. UHL.